(12) United States Patent
Choudhary et al.

(10) Patent No.: US 7,288,240 B2
(45) Date of Patent: Oct. 30, 2007

(54) METHOD FOR PRODUCTION OF HYDROGEN PEROXIDE WITH IMPROVED YIELD AND SELECTIVITY BY DIRECT OXIDATION OF HYDROGEN OVER PALLADIUM CONTAINING CATALYST

(75) Inventors: Vasant Ramchandra Choudhary, Pune (IN); Chancal Samanta, Pune (IN); Prabhas Jana, Pune (IN)

(73) Assignee: Council Of Scientific And Industrial Research, New Delhi (IN)

( * ) Notice: Subject to any disclaimer, the term of this patent is extended or adjusted under 35 U.S.C. 154(b) by 0 days.

(21) Appl. No.: 11/167,573

(22) Filed: Jun. 27, 2005

(65) Prior Publication Data

US 2006/0120949 A1  Jun. 8, 2006

(51) Int. Cl.
*C01B 15/029* (2006.01)
*B01J 27/13* (2006.01)

(52) U.S. Cl. ............................ 423/584; 502/230
(58) Field of Classification Search ............... 423/584; 502/230
See application file for complete search history.

(56) References Cited

U.S. PATENT DOCUMENTS

| | | | | |
|---|---|---|---|---|
| 4,256,608 A | * | 3/1981 | Antos | 502/230 |
| 5,922,639 A | * | 7/1999 | Alario et al. | 502/230 |
| 5,965,101 A | * | 10/1999 | Goto et al. | 423/584 |
| 6,117,409 A | * | 9/2000 | Bertsch-Frank et al. | 423/584 |
| 6,218,334 B1 | * | 4/2001 | Alario et al. | 502/226 |
| 2001/0024634 A1 | * | 9/2001 | Bertsch-Frank et al. | 423/584 |

OTHER PUBLICATIONS

Drastic increase of selectivity for $H_2O_2$ formation in direct oxidation of $H_2$ to $H_2O_2$ over supported Pd catalysts due to their bromination; Chem Comm 2004, 2054-2055; Choudhary, Samanta, Giakwad, no month.

* cited by examiner

*Primary Examiner*—Wayne A. Langel
(74) *Attorney, Agent, or Firm*—Ladas & Parry LLC

(57) ABSTRACT

A method for improving drastically both the selectivity and yield of hydrogen peroxide in the direct oxidation of hydrogen to hydrogen peroxide over a solid catalyst comprising palladium, which comprises:

i) depositing on the solid catalyst at least two halogen containing compounds, one compound essentially comprising bromine and second compound essentially comprising fluorine with the bromine to palladium and fluorine to palladium atom ratios in the range from 0.02 to 20 and from 0.01 to 50, respectively;

ii) decomposing the halo compounds deposited on the solid catalyst by calcination at a temperature above 200° C. under inert, reducing or oxidizing gas atmosphere or under vacuum; and iii) contacting the solid catalyst obtained from step (ii) with a gas mixture consisting of hydrogen and oxygen or air or $O_2$ enriched air in an aqueous reaction medium, comprising a mineral acid at the following reaction conditions: concentration of mineral acid in the reaction medium above 0.001 mol/dm³, concentration of the solid catalyst in the reaction medium above 0.01 g/dm³, $H_2/O_2$ mole ratio in the gas mixture in the range from 0.01 to 10, flow rate of the gas mixture in the range from 50 cm³/g catalyst/h to 50,000 cm³/g catalyst/h, gas pressure at least 0.9 atm, and temperature below 100° C. and contact period of the reaction medium at least 0.01 h, is disclosed.

19 Claims, No Drawings

METHOD FOR PRODUCTION OF HYDROGEN PEROXIDE WITH IMPROVED YIELD AND SELECTIVITY BY DIRECT OXIDATION OF HYDROGEN OVER PALLADIUM CONTAINING CATALYST

FIELD OF THE INVENTION

The present invention relates to a method for the production of hydrogen peroxide with improved yield and selectivity by the direct oxidation of hydrogen by oxygen to hydrogen peroxide over a solid catalyst comprising palladium. More particularly, the present invention relates to a method for substantially improving both the selectivity and yield of hydrogen peroxide in the direct oxidation of hydrogen by oxygen to hydrogen peroxide over a solid catalyst comprising palladium by incorporating bromide and fluoride anions in the catalyst. The method of this invention has utility in the chemical and petrochemical industries due to the production of hydrogen peroxide with high selectivity and yield by the direct oxidation of hydrogen by oxygen, using a solid catalyst comprising palladium, in an environmentally clean manner.

BACKGROUND OF THE INVENTION

Currently, commonly used commercial scale production of hydrogen peroxide is based on an auto oxidation process employing alkyl anthraquinone as the working material. This process involves reduction of alkyl anthraquinone dissolved in an organic working solution to alkyl anthraquinol. The alkyl anthraquinol is oxidized by air to produce hydrogen peroxide and alkyl anthraquinone, which is recycled in this process. This process comprises a number of operations involving reduction, oxidation, separation by aqueous extractions, refining and concentration, making the process complex. Apart from the requirements of high capital and operation costs, this process has following limitations and disadvantages:

- Non-selective in hydrogenation, hence loss of anthraquinone.
- Difficulties in separation hydrogenation catalyst and degradation products.
- Need for the regenaration of used hydrogenation catalyst.
- Need for the removal of organic matters from the extracted $H_2O_2$ solution.
- Waste treatment and disposal of undesired side products of the cyclic process.

Demand for hydrogen peroxide has been continuously increasing in the field of oxidation of organic compounds to value added products, wastewater treatment and water disinfection. Hence, there is a great practical need for replacing the anthraquinone process by an environmentally clean and more economic process such as a direct partial oxidation of hydrogen by oxygen to hydrogen peroxide with high conversion and selectivity.

Since the disclosure in U.S. Pat. No. 1,108,752 by Henkel et al. that palladium is a catalyst promoting the formation of hydrogen peroxide and water from a mixture of hydrogen and oxygen, a number of palladium containing catalysts, useful for the direct oxidation of hydrogen by oxygen to hydrogen peroxide, are disclosed in several granted patents and patent applications.

U.S. Pat. No. 4,832,938 by Gosser et al. discloses a Pt—Pd bimetallic catalyst supported on a carbon, silica or alumina support for making hydrogen peroxide from a direct combination of hydrogen and oxygen in an aqueous reaction medium. German Patent Ger. Offen. GE 4127918 A1 by Lueckoff et al. discloses a supported palladium gold catalyst for the manufacture of hydrogen peroxide from hydrogen and oxygen in an aqueous medium; the catalyst contains 5-95 wt % Au and is supported on carbon. A number of platinum Group metal containing catalysts: (1) Pt-group metal on high surface area support, such as carbon, silica or alumina (Ref. U.S. Pat. No. 5,169,618); (2) Pt-Group element supported on solid acid carrier (Ref. Eur. Pat. Appl. EP 504,741, A1); (3) Pt-Group element supported on Nb- or Ta oxide (Ref. PCT Int. Appl. WO 9412428 A1); (4) Sn-modified Pt-Group metals supported on catalysts carriers (Ref. Eur. Pat. Appl. EP 621,235 A1); (5) Pt-Group metals supported on hydrophilic support (Ref. U.S. Pat. No. 5,399,334); for the oxidation of hydrogen to hydrogen peroxide are known in the prior art.

Japanese Patent Jpn. Kokai Tokkyo Koho JP 01133909 A2 by Kyora discloses a Pt-Group metal catalyst carried on a hydrophobic support such as porous and hydrophobic Teflon support. European Patent EP 366419 A1 discloses a Group VIII metal catalyst deposited on a hydrophobic support for the manufacture of hydrogen peroxide by reacting hydrogen with oxygen in an aqueous medium. WO 93/14025 A1 teaches a Group VIII metal deposited on a partially hydrophobic and partially hydrophilic support, such as Pd on fluorinated carbon, as a catalyst for the oxidation of hydrogen-to-hydrogen peroxide.

While there are several disclosures regarding the formation of hydrogen peroxide, the applicants herein are unaware of any practice relating to the direct oxidation of hydrogen-to-hydrogen peroxide for the production of hydrogen peroxide. One reason for this is the poor hydrogen peroxide selectivity and yield observed in this process.

Choudhary et al. in U.S. Pat. No. 6,534,440 disclose a process for the activation of a catalyst comprising metallic palladium, useful for the direct oxidation of hydrogen by oxygen to hydrogen peroxide, which comprises treating the catalyst with an oxidizing agent, preferably selected from perchloric acid, hydrogen peroxide, nitrous oxide and oxygen or air, such that not only a surface oxidation but also at least a partial bulk oxidation of the metallic palladium, present in the catalyst, to palladium (II) oxide (PdO) occurs; and optionally calcining the treated catalyst at a temperature in the range from about 50° C. to about 500° C. However, the increase in the hydrogen peroxide selectivity and/or yield by this method is small.

U.S. Pat. Nos. 4,681,751; 4,772,458; 4,889,705; 5,135,731 of Gosser et al. disclose the use of halide promoters added to acidic liquid reaction medium employed for the direct oxidation of hydrogen to hydrogen peroxide over a metallic catalyst for improving the hydrogen peroxide yield in the process. However, because of the presence of halide anions, the acidic liquid reaction medium becomes highly corrosive, limiting the use of halides in the liquid medium for the purpose of improving selectivity or yield of hydrogen peroxide in the process.

It is therefore of importance to develop a method, which overcomes the limitations of the earlier methods, for drastically improving both the selectivity and yield of hydrogen peroxide in the direct oxidation of hydrogen by oxygen to hydrogen peroxide.

OBJECTS OF THE INVENTION

The main object of this invention is to provide a method for improving drastically both the selectivity and yield of hydrogen peroxide in the direct oxidation of hydrogen-to-hydrogen peroxide over a solid catalyst comprising palladium by incorporating halogen promoters in the solid catalyst before its use in the direct oxidation of hydrogen to hydrogen peroxide and thereby to produce hydrogen peroxide with high selectivity and yield from the combination of hydrogen and oxygen.

SUMMARY OF THE INVENTION

Accordingly, the present invention provides a method for the production of hydrogen peroxide by direct oxidation of hydrogen to hydrogen peroxide over a solid catalyst comprising palladium, the method comprising:

(i) depositing at least two halogen containing compounds on the solid catalyst, a first halogen containing compound essentially comprising bromine and a second halogen compound comprising essentially fluorine, with the bromine to palladium and fluorine to palladium atom ratios in the range from 0.02 to 20 and from 0.01 to 50, respectively;

(ii) decomposing the halogen compounds deposited on the solid catalyst in step (i) by calcination at a temperature above 200° C. under inert, reducing or oxidizing gas atmosphere or under vacuum; and ii) contacting a solid catalyst obtained from step (ii) with a gas mixture consisting of hydrogen and oxygen or air or $O_2$ enriched air in an aqueous reaction medium containing a mineral acid.

In one embodiment of the invention, the compound comprising bromine is selected from ammonium bromide and hydrobromic acid.

In another embodiment of the invention, the compound comprising fluorine is selected from ammonium fluoride and hydrofluoric acid.

In another embodiment of the invention, in step (iii) the concentration of mineral acid in the reaction medium is above 0.001 mol/dm³, concentration of the solid catalyst in the reaction medium is above 0.01 g/dm³, $H_2/O_2$ mole ratio in the gas mixture is in the range from 0.01 to 10, flow rate of the gas mixture is in the range from 50 cm³/g catalyst/h to 50,000 cm³/g catalyst/h, gas pressure is at least 0.9 atm, and temperature is below 100° C. and contact period of the reaction medium is at least 0.01 h.

In another embodiment of the invention, the bromine to palladium atom ratio is between 0.1 and 5.

In another embodiment of the invention, the fluorine to palladium atom ratio is between 0.05 and 10.

In another embodiment of the invention, the calcination temperature in step (ii) is between 300° C. and 600° C.

In another embodiment of the invention, the gas atmosphere for the decomposition in step (ii) is inert gas atmosphere selected from the group consisting of nitrogen, helium and argon.

In another embodiment of the invention, in step (iii) the mineral acid in the reaction medium is phosphoric acid.

In another embodiment of the invention, in step (iii) the concentration of mineral acid in the reaction medium is between 0.01 mol/dm³ and 1.0 mol/dm³.

In another embodiment of the invention, in step (iii) the concentration of the catalyst in the reaction medium is between 0.5 g/dm³ and 25 g/dm³.

In another embodiment of the invention, in step (iii) the $H_2/O_2$ mole ratio in the gas mixture is between 0.04 and 4.0.

In another embodiment of the invention, in step (iii) flow rate of the gas mixture is between 500 cm³/g catalyst/h and 10,000 cm³/g catalyst/h.

In another embodiment of the invention, the gas mixture in step (iii) is a mixture of $H_2$ and $O_2$.

In another embodiment of the invention, in step (iii) the temperature is between 5° C. and 50° C.

In another embodiment of the invention, in step (iii) the contact period of the reaction medium is between 0.2 h and 10 h.

In another embodiment of the invention, in step (iii) the $H_2/O_2$ mole ratio in the gas mixture is about 1.

DETAILED DESCRIPTION OF THE INVENTION

The present invention provides a method for improving drastically both the selectivity and yield of hydrogen peroxide in the direct oxidation of hydrogen-to-hydrogen peroxide over a solid catalyst comprising palladium, which comprises:

i) depositing on the solid catalyst at least two halogen containing compounds, one compound essentially comprising bromine and second compound essentially fluorine with the bromine to palladium and fluorine to palladium atom ratios in the range from 0.02 to 20 and from 0.01 to 50, respectively;

ii) decomposing the halo compounds deposited on the solid catalyst by calcinations at a temperature above 200° C. under inert, reducing or oxidizing gas atmosphere or under vacuum; and iii) contacting the solid catalyst obtained from step (ii) with a gas mixture consisting of hydrogen and oxygen or air or $O_2$ enriched air in an aqueous reaction medium, comprising a mineral acid at the following reaction conditions:

concentration of mineral acid in the reaction medium above 0.001 mol/dm³, concentration of the solid catalyst in the reaction medium above 0.01 g/dm³, $H_2/O_2$ mole ratio in the gas mixture in the range from 0.01 to 100, flow rate of the gas mixture in the range from 50 cm³/g catalyst/h to 50,000 cm³/g catalyst/h, gas pressure at least 0.9 atm, and temperature below 100° C. and contact period of the reaction medium at least 0.01 h.

The catalyst comprising palladium may contain a palladium metal, with or without one or more of other noble metals, such as platinum, ruthenium, rhodium, iridium and osmium and also with or without one or more promoter metals, such as tin, gold and other metal promoters, supported on catalyst carriers such as carbon, alumina, silica-alumina, silica, zeolites, zirconia, thoria, ceria and other metal oxides or mixed metal oxides in form of power, particles, pellets, extrudes or monolith and structured metallic catalyst supports.

Examples of the solid catalyst comprising palladium are Pd or PdO, with or without Au, Ag, or other transition metal or metal oxides, supported on porous solids, such as metal oxides, e.g. $Al_2O_3$, $SiO_2$, $ZrO_2$, $CeO_2$, $TiO_2$, $Y_2O_3$, $ThO_2$, $Ga_2O_3$, $B_2O_3$, and like or crystalline micro- or meso-porous metalosilicates or phosphates, known in the prior art. These catalysts may be prepared by impregnating palladium salt on the support or co-precipitation of mixed metal compounds, which on thermal decomposition are converted into oxides, followed by calcinations at elevated temperature. The calcined catalysts may or may not be reduced by hydrogen, ammoniacal hydrazine or other methods known in the prior art. The concentration of palladium in the catalyst may be between 0.1 wt % and 10 wt %. A number of inorganic or organic compounds comprising bromine or fluorine, such as ammonium bromide or fluoride, ammonium fluoro silicate, hydrobromic or hydrofluoric acid, HBr, HF, bromo-organic compounds, fluoro organic compounds, bromo or fluororganic silanes, and the like are known in the prior art. Examples of inert gas are nitrogen, helium, argon or the like. Examples of the oxidizing gas are oxygen, oxygen enriched air. Examples of reducing gas are hydrogen, carbon monoxide and the like. Also, a number of mineral acids, such as sulfuric acid, phosphoric acid, hydrochloric acid, hydrobromic acid, nitric acid and the like are known in the prior art.

In the method of this invention, the preferred compound comprising bromine is ammonium bromide or hydrobromic acid; the preferred compound comprising fluorine is ammonium fluoride or hydrofluoric acid; the preferred bromine to palladium atom ratio is between 0.1 and 5; the preferred fluorine to palladium atom ratio is between 0.05 and 10; the preferred calcinations temperature in step (ii) is between 300° C. and 600° C.; the preferred gas atmosphere for the decomposition in step (ii) is inert gas atmosphere, such as nitrogen, helium or argon; the preferred mineral acid in the reaction medium is phosphoric acid; the preferred concentration of mineral acid in the reaction medium is between 0.01 $mol/dm^3$ and 1.0 $mol/dm^3$; the preferred concentration of the catalyst in the reaction mixture is between 0.5 $g/dm^3$ and 25 $g/dm^3$; the preferred $H_2/O_2$ mole ratio is between 0.04 and 4.0; the preferred flow rate of the gas mixture is between 500 $cm^3$/g catalyst/h and 10,000 $cm^3$/g catalyst/h; the preferred gas mixture is a mixture of $H_2$ and $O_2$; the preferred temperature in step (iii) is between 5° C. and 50° C.; and the preferred contact period of the reaction medium with the catalyst is between 0.2 h and 10 h and the more preferred $H_2/O_2$ mole ratio is about 1.

In the method of this invention, the steps (i) and step (ii) are critical. In the step (i), bromine and fluorine containing compounds are deposited on solid catalyst comprising palladium by impregnating the halo compounds on the catalyst or by passing vapours of the halo compounds over the catalyst. The halo compounds may be deposited on the catalyst simultaneously or one after another. In the step (ii), the halo compounds deposited on the catalyst are decomposed, leaving on the catalyst at least part of the bromine and fluorine present in the halo compounds. When, the composition is carried out in an inert or reducing gas atmosphere, at least part of palladium present in the catalyst is in reduced form i.e. as metallic Pd. However, when the decomposition is carried out in an oxidizing atmosphere, at least part of palladium present in the catalyst is in oxidized form i.e. as palladium oxide.

Step (iii) of the method of this invention may be carried out in a stirred, bubble column or packed bed operated in the batch or continuous mode with respect to the reaction medium. In the continuous operation, the reaction medium may or may not be recycled in the reactor. For a stirred or bubble column reactor, the catalyst is in finely powdered form, whereas for a packed bed reactor, the catalyst may be in the form or granules or pellets. Step (iii) may also be carried out using a trickle bed reactor known in the prior art, with or without recycle of the liquid reaction medium. In the trickle bed reactor, the solid catalyst is packed in the reactor and the liquid reaction medium is trickled over the catalyst, while gaseous reactants are passed cocurrently or countercurrently with respect to the liquid flow.

In step (iii) of the method of this invention, hydrogen and oxygen are reactants, which are dissolved in the reaction medium and the dissolved hydrogen and oxygen react over the solid catalyst to produce hydrogen peroxide and water as the products. The role of the solid catalyst to activate both the hydrogen and oxygen for selective oxidation of hydrogen by oxygen to hydrogen peroxide. The role of aqueous reaction medium is to dissolve both the gaseous reactants, $H_2$ and $O_2$, for the reaction between them to occur in the liquid phase over the catalyst. The role of mineral acid in the reaction medium is to reduce the decomposition of $H_2O_2$, which is formed in the reaction, to oxygen and water and thereby increasing the $H_2O_2$ selectivity or yield of formation in the $H_2$ to $H_2O_2$ oxidation.

The role of fluorine in the catalyst is to increase the activity of the catalyst for hydrogen oxidation and/or to create or increase protonic acidity of the catalyst. Whereas, the role of bromine in the catalyst is to drastically increase the $H_2O_2$ yield and/or selectivity in the $H_2$-to-$H_2O_2$ oxidation by inhibiting $H_2O_2$ conversion activity of the catalyst and also by inhibiting the direct oxidation of $H_2$ to water over the catalyst.

In step (i) and step (iii) of the method of this invention, solid catalyst comprising palladium is activated so that its activity for the selective direct oxidation of hydrogen by oxygen to hydrogen peroxide is drastically increased. However, once activated in step (i) and step (ii) and used in step (iii) for producing hydrogen peroxide from oxygen and hydrogen, the catalyst obtained from step (iii) after the reaction may be reused several times without its reactivation in step (i) and step (ii) for the direct oxidation of hydrogen to hydrogen peroxide by following the procedure outlined in step (iii) of the process of this invention. In case of the repeated reuse of the catalyst for the direct oxidation of hydrogen-to-hydrogen peroxide, if the catalyst, looses its activity due to the loss of Br and/or F, then the deactivated catalyst may be reactivated by subjecting the deactivated catalyst to step (i) and step (ii) of the method of this invention.

Modifications such as addition of other halogens such as chlorine and/or iodine, at low concentrations in the palladium catalyst are within the scope of the invention. However, because of the incorporation of chlorine and/or iodine in the catalyst, the increase in the $H_2O_2$ selectivity in the $H_2$-to-$H_2O_2$ oxidation over the catalyst may be much smaller and/or the catalyst may be deactivated for the $H_2$-to-$H_2O_2$ oxidation.

The main finding of this invention is that both the selectivity and yield of hydrogen peroxide in the direct oxidation of hydrogen to hydrogen peroxide over a solid catalyst comprising palladium are increased drastically when bromine and fluorine promoters are incorporated in the solid catalyst before its use in the direct $H_2$-to-$H_2O_2$ oxidation process. Another important finding of this invention is that, when the preferred mineral acid, phosphoric acid, is used in the reaction medium, there is no leaching of active components, such as palladium and halogen promoters from the solid catalyst during the direct $H_2$-to-$H_2O_2$ oxidation process and hence the catalyst has high stability and excellent reusability in the process. Yet another important finding of this invention is that, hydrogen can be directly oxidized to hydrogen peroxide with high selectivity at a very high conversion, providing hydrogen peroxide at a concentration as high as 1.5 w/v %, even at atmospheric pressure. Further important finding of this invention is that, the used catalyst of this invention can be used directly, without its reactivation in step (i) and step (ii), for the oxidation of hydrogen-to-hydrogen peroxide with only little or no loss of the catalyst activity.

The present invention is described with respect to the following examples illustrating the methods of this invention for drastically improving both the selectivity and yield of hydrogen peroxide in the direct oxidation of hydrogen by oxygen to hydrogen peroxide over a solid catalyst comprising palladium. The examples are provided by way of illustration and should not be construed as limiting the scope of the invention in any manner.

DEFINITION OF TERMS USED IN THE EXAMPLES

Conversion of $H_2$ (%)=mole % of the hydrogen (present in the feed) converted to all products
Selectivity for $H_2O_2$ (%)=[{conversion of $H_2$ to $H_2O_2$ (%)}/{conversion of $H_2$ to all products (%)}]×100
Yield of $H_2O_2$ (%)=mole % of $H_2$ (present in the feed) converted to $H_2O_2$=[{conversion of $H_2$ (%)×{selectivity for $H_2O_2$ (%)}]/100
Conversion of $H_2O_2$=mole % of the hydrogen peroxide converted to water and oxygen The flow rate of gases is measured at 0° C. and 1 atm pressure. Gas hourly space velocity (GHSV) is a volume of gas, measured at 0° C. and 1 atm pressure, passed through the reactor per unit mass of catalyst per hour.

EXAMPLE-1

This example illustrates the method of this invention for drastically improving the selectivity and yield of hydrogen peroxide in the direct oxidation of hydrogen by oxygen over Pd (5 wt %)/alumina, obtained from Lancaster, UK.

The method was carried out in the following three steps:

Step (i): The Pd/alumina was impregnated with ammonium fluoride and ammonium bromide by mixing 5 g Pd/alumina with 13.3 ml aqueous solution containing 0.63 mmol ammonium fluoride and 0.63 mmol ammonium bromide and drying the wet mass on water bath to get the impregnated Pd/alumina with the F/Pd and Br/Pd atom ratio of 0.27 and 0.27, respectively.

Step (ii): The impregnated Pd/alumina catalyst was calcined in a tubular quartz reactor in a flow of nitrogen (20 cm$^3$/min) at 400° C. for 1 h.

Step (iii): The solid catalyst obtained from step (ii) was contacted with hydrogen and oxygen dissolved in an aqueous solution of mineral acid, which is a reaction medium, in a magnetically stirred reactor made up of glass and with a jacket for circulating a constant temperature water for controlling the reaction temperature, while bubbling continuously a mixture of hydrogen and oxygen through the reaction medium, at the following reaction conditions:

| | |
|---|---|
| Reactor capacity: | 100 ml |
| Amount of catalyst: | 0.1 g |
| Reaction medium: | aqueous 0.1 M phosphoric acid solution |
| $H_2/O_2$ mole ratio: | 1.0 |
| Gas flow rate: | 2900 cm$^3$/g catalyst/h |
| Pressure: | 1.0 atm |
| Temperature: | 25° C. |
| Reaction contact period: | 1 h |

After the reaction, the solid catalyst from the reaction medium was separated by filtration and the $H_2O_2$ present in the reaction medium was analyzed by the iodometric titration. The results obtained are as follows:
Concentration of $H_2O_2$ in the reaction medium=0.36 wt/v %.
Yield of hydrogen peroxide base on hydrogen=79.4%
Selectivity of hydrogen peroxide=80%
Conversion of hydrogen=99%

When the catalyst after the reaction in step (iii) was reused directly for the oxidation of hydrogen by oxygen to hydrogen peroxide according to the procedure same as that described in the step (iii), at the following reaction conditions same as that given above, the results obtained were as follows:
Concentration of $H_2O_2$ in the reaction medium=0.35 wt/v %.
Yield of hydrogen peroxide base on hydrogen=79.5%
Selectivity of hydrogen peroxide=79.9%
Conversion of hydrogen=99.5%
These results show excellent reusability of the used catalyst without its reactivation.

However, when Pd/alumina catalyst without its modifications in step (i) and (ii) was directly used in the step (iii) at the above conditions, the yield of hydrogen peroxide was less than 1.0%; there was very little or no formation of hydrogen peroxide in the oxidation of hydrogen.

EXAMPLES-2 to 16

These examples further illustrate the method of this invention for drastically improving the selectivity and yield of hydrogen peroxide in the direct oxidation of hydrogen by oxygen over Pd (5 wt %)/alumina, obtained from Lancaster, UK.

In these examples the method of the invention was carried out in the three steps described in Example-1 except that, in step (i) the amount of ammonium bromide was 0.63 mmol and in the step (iii), the reaction conditions were different, as given in Table-1. The results obtained are included in Table-1.

EXAMPLES-17 to 19

These examples also further illustrate the method of this invention for drastically improving the selectivity and yield of hydrogen peroxide in the direct oxidation of hydrogen by oxygen over Pd (5 wt %)/alumina, obtained from Lancaster, UK.

In these examples the method of the invention was carried out in the three steps described in Example-1 except that, in the step (i) the amounts of ammonium fluoride and ammonium bromide and consequently the F/Pd and/or Br/Pd atom ratios were different, and also, in some examples, the reaction conditions used in step (iii) were different, as given in Table-2. The results obtained are included in Table-2.

EXAMPLES-20 to 31

These examples also further illustrate the method of this invention for drastically improving the selectivity and yield of hydrogen peroxide in the direct oxidation of hydrogen by oxygen over different solid catalysts comprising palladium.

The method of the invention was carried out in the three steps as described in Example-1 except that, the solid catalyst comprising palladium and also the conditions used in the three steps are different, as given in Table-3. The results are included in Table-3.

The Pd (1%)/$Al_2O_3$ and Pd (5%)/$Al_2O_3$ were obtained from Lancaster, UK. The other solid catalysts comprising palladium, Pd (2.5%)/$ZrO_2$, Pd (2.5%)/$Ga_2O_3$, Pd (2.5%)/Hβ and Pd (2.5%)/$SiO_2$, were prepared by impregnating 1.0 g $ZrO_2$ or $Ga_2O_3$ or Hβ zeolite or $SiO_2$ gel with 0.25 mmol palladium acetate from its acetonitrile solution, drying on water bath under stirring, calcining at 500° C. for 3 h and then reducing by ammoniacal hydrazine at room temperature, followed by washing and drying the resulting catalyst.

The results in Examples 21 to 29 show that, when the solid catalysts comprising palladium were not modified in step (i) and step (ii), both the $H_2O_2$ yield and selectivity in the oxidation of $H_2$ were zero or very much lower than the case when the catalysts were modified in steps (i) and (ii) by the method of this invention.

EXAMPLES-32 to 42

These examples illustrate that after the modification of in step (i) and step (ii) of the method of this invention, solid catalysts comprising palladium show much less activity for $H_2O_2$ decomposition reaction than that observed without their modification in the steps (i) and (ii).

Steps (i) and step (ii) were carried out by the procedure similar to that described in Examples earlier as indicated in Table-4. The $H_2O_2$ decomposition over the solid catalysts before and after their modification in step (i) and step (ii) was carried out in a magnetically stirred glass reactor (capacity=250 $cm^3$) containing 0.2 g catalyst and 150 $cm^3$ of aqueous 0.03 M phosphoric acid solution by injecting 1 ml 30 w/v % $H_2O_2$ into the reaction medium at 27° C. The amount of $O_2$ liberated in the decomposition, according to the reaction: $H_2O_2 \rightarrow H_2O + 0.5\ O_2$, was measured quantitatively as a function of time using a constant pressure gas collector. The $H_2O_2$ conversion for the reaction period of 0.25 h and 1.0 h was estimated from the amount of $O_2$ evolved in the decomposition and the reaction stoichiometry. The results are included in Table-4.

TABLE 1

Result of the direct oxidation of hydrogen by oxygen to hydrogen peroxide for different conditions employed in step (iii).

|  | Example-2 | Example-3 | Example-4 |
|---|---|---|---|
| Reaction Conditions in Step (iii) | | | |
| Reactor capacity ($cm^3$) | 100 | 100 | 100 |
| Mineral acid used | $H_3PO_4$ | $H_3PO_4$ | $H_3PO_4$ |
| Concn. of mineral acid (mol/$dm^3$) | 0.1 | 0.1 | 0.1 |
| Volume of mineral acid ($cm^3$) | 50 | 50 | 50 |
| Concn. of solid catalyst (g/$dm^3$) | 2 | 2 | 2 |
| $H_2/O_2$ mole ratio in gas mixture | 1.0 | 1.0 | 0.5 |
| Flow rate of gas mixture ($cm^3$/g catalyst/h) | 2900 | 2900 | 2900 |
| Temperature (° C.) | 5 | 50 | 27 |
| Pressure (atm) | 0.99 | 0.98 | 1.0 |
| Contact period (h) | 2.0 | 1.5 | 1.0 |
| Results of $H_2$—to—$H_2O_2$ Oxidation | | | |
| Conversion of hydrogen (%) | 58.9 | 93.3 | 82.0 |
| Yield of $H_2O_2$ (%) | 27.7 | 38.7 | 50.5 |
| Selectivity of $H_2O_2$ (%) | 47.0 | 41.5 | 62.0 |
| Concentration of $H_2O_2$ (wt/vol %) | 0.24 | 0.26 | 0.15 |

|  | Example-5 | Example-6 | Example-7 |
|---|---|---|---|
| Reaction Conditions in Step (iii) | | | |
| Reactor capacity ($cm^3$) | 100 | 100 | 100 |
| Mineral acid used | $H_3PO_4$ | $H_3PO_4$ | $H_3PO_4$ |
| Concn. of mineral acid (mol/$dm^3$) | 0.1 | 0.1 | 0.1 |
| Volume of mineral acid ($cm^3$) | 50 | 50 | 50 |
| Concn. of solid catalyst (g/$dm^3$) | 2 | 2 | 2 |
| $H_2/O_2$ mole ratio in gas mixture | 1.9 | 1.0 | 1.0 |
| Flow rate of gas mixture ($cm^3$/g catalyst/h) | 2900 | 2900 | 11590 |
| Temperature (° C.) | 25 | 27 | 26 |
| Pressure (atm) | 1.2 | 1.0 | 1.1 |
| Contact period (h) | 1.0 | 2.0 | 1.0 |
| Results of $H_2$—to—$H_2O_2$ Oxidation | | | |
| Conversion of hydrogen (%) | 100 | 94.2 | 42.4 |
| Yield of $H_2O_2$ (%) | 5.4 | 53.7 | 18.0 |
| Selectivity of $H_2O_2$ (%) | 5.4 | 57.0 | 42.5 |
| Concentration of $H_2O_2$ (wt/vol %) | 0.03 | 0.48 | 0.32 |

|  | Example-8 | Example-9 | Example-10 |
|---|---|---|---|
| Reaction Conditions in Step (iii) | | | |
| Reactor capacity ($cm^3$) | 100 | 100 | 100 |
| Mineral acid used | $H_3PO_4$ | $H_2SO_4$ | $H_3PO_4$ |
| Concn. of mineral acid (mol/$dm^3$) | 0.1 | 0.05 | 1.0 |
| Volume of mineral acid ($cm^3$) | 50 | 50 | 50 |
| Concn. of solid catalyst (g/$dm^3$) | 0.4 | 2.0 | 2.0 |
| $H_2/O_2$ mole ratio in gas mixture | 1.0 | 1.0 | 1.0 |
| Flow rate of gas mixture ($cm^3$/g catalyst/h) | 2900 | 4800 | 2900 |

TABLE 1-continued

Result of the direct oxidation of hydrogen by oxygen to hydrogen peroxide for different conditions employed in step (iii).

| | | | |
|---|---|---|---|
| Temperature (° C.) | 27 | 35 | 25 |
| Pressure (atm) | 1.0 | 1.3 | 1.0 |
| Contact period (h) | 1.0 | 1.0 | 1.0 |
| Results of $H_2$— to —$H_2O_2$ Oxidation | | | |
| Conversion of hydrogen (%) | 45.8 | 94.1 | 95.7 |
| Yield of $H_2O_2$ (%) | 22.9 | 35.5 | 62.5 |
| Selectivity of $H_2O_2$ (%) | 50.0 | 37.7 | 65.3 |
| Concentration of $H_2O_2$ (wt/vol %) | 0.1 | 0.26 | 0.28 |

| | Example-11 | Example-12 | Example-13 |
|---|---|---|---|
| Reaction Conditions in Step (iii) | | | |
| Reactor capacity (cm³) | 100 | 250 | 100 |
| Mineral acid used | $H_3PO_4$ | $H_3PO_4$ | $H_3PO_4$ |
| Concn. of mineral acid (mol/dm³) | 0.1 | 1.0 | 0.1 |
| Volume of mineral acid (cm³) | 50 | 150 | 50 |
| Concn. of solid catalyst (g/dm³) | 2 | 3.3 | 2 |
| $H_2/O_2$ mole ratio in gas mixture | 1.0 | 1.0 | 1.0 |
| Flow rate of gas mixture (cm³/g catalyst/h) | 2900 | 1770 | 3000 |
| Temperature (° C.) | 30 | 27 | 27 |
| Pressure (atm) | 1.0 | 1.0 | 1.0 |
| Contact period (h) | 4.0 | 0.25 | 8.0 |
| Results of $H_2$— to —$H_2O_2$ Oxidation | | | |
| Conversion of hydrogen (%) | 100 | 100 | 91.4 |
| Yield of $H_2O_2$ (%) | 40.9 | 38.6 | 42.1 |
| Selectivity of $H_2O_2$ (%) | 40.9 | 38.6 | 46.0 |
| Concentration of $H_2O_2$ (wt/vol %) | 0.72 | 0.043 | 1.47 |

| | Example-14 | Example-15 | Example-16 |
|---|---|---|---|
| Reaction Conditions in Step (iii) | | | |
| Reactor capacity (cm³) | 50 | 50 | 50 |
| Mineral acid used | $H_3PO_4$ | $H_3PO_4$ | $H_3PO_4$ |
| Concn. of mineral acid (mol/dm³) | 0.1 | 0.1 | 0.1 |
| Volume of mineral acid (cm³) | 30 | 30 | 30 |
| Concn. of solid catalyst (g/dm³) | 3.3 | 3.3 | 0.66 |
| $H_2/O_2$ mole ratio in gas mixture | 1.0 | 1.0 | 1.0 |
| Flow rate of gas mixture (cm³/g catalyst/h) | 2900 | 2900 | 14500 |

TABLE 1-continued

Result of the direct oxidation of hydrogen by oxygen to hydrogen peroxide for different conditions employed in step (iii).

| | | | |
|---|---|---|---|
| Temperature (° C.) | 27 | 27 | 27 |
| Pressure (atm) | 1.0 | 1.0 | 1.0 |
| Contact period (h) | 1.0 | 2.0 | 1.0 |
| Results of $H_2$— to —$H_2O_2$ Oxidation | | | |
| Conversion of hydrogen (%) | 96.6 | 94.2 | 55.2 |
| Yield of $H_2O_2$ (%) | 44.4 | 42.5 | 20.1 |
| Selectivity of $H_2O_2$ (%) | 46.0 | 46.0 | 36.5 |
| Concentration of $H_2O_2$ (wt/vol %) | 0.32 | 0.62 | 0.15 |

TABLE 2

Result of the direct oxidation of hydrogen by oxygen to hydrogen peroxide for different conditions employed in step (i), step (ii) and step (iii)

| | Example-17 | Example-18 | Example-19 |
|---|---|---|---|
| Solid catalyst used in step (i) | Pd (5%)/$Al_2O_3$ | Pd (5%)/$Al_2O_3$ | Pd (5%)/$Al_2O_3$ |
| Amount of $NH_4Br$ used in step (i) (mmol) | 1.25 | 6.25 | 0.625 |
| Amount of $NH_4F$ used in step (i) (mmol) | 2.63 | 2.63 | 0.12 |
| Br/Pd atom ratio | 0.53 | 2.66 | 0.27 |
| F/Pd atom ratio | 1.12 | 1.12 | 0.05 |
| Reaction Conditions in Step (iii) | | | |
| Reactor capacity (cm³) | 100 | 100 | 250 |
| Mineral acid used | $H_3PO_4$ | $H_3PO_4$ | $H_3PO_4$ |
| Concn. of mineral acid (mol/dm³) | 0.1 | 0.1 | 0.03 |
| Volume of mineral acid (cm³) | 50 | 50 | 150 |
| Concn. of solid catalyst (g/dm³) | 2.1 | 2.2 | 3.3 |
| $H_2/O_2$ mole ratio in gas mixture | 1.0 | 1.0 | 0.05 |
| Flow rate of gas mixture (cm³/g/h) | 2900 | 3000 | 1600 |
| Pressure (atm) | 1.1 | 1.0 | 0.95 |
| Temperature (° C.) | 25 | 26 | 27 |
| Contact period (h) | 1.0 | 1.0 | 3.0 |
| Results of $H_2$— to —$H_2O_2$ Oxidation | | | |
| Conversion of hydrogen (%) | 91.3 | 80.4 | 50.5 |
| Yield of $H_2O_2$ (%) | 54.4 | 45.8 | 31.6 |
| Selectivity of $H_2O_2$ (%) | 59.4 | 57.0 | 62.5 |
| Concentration of $H_2O_2$ (wt/vol %) | 0.24 | 0.21 | 0.035 |

TABLE 3

Result of the direct oxidation of hydrogen by oxygen to hydrogen peroxide
for different conditions employed in step (i), step (ii) and step (iii)

|  | Example-20 | Example-21 | Example-22 |
|---|---|---|---|
| Solid catalyst used in step (i) | Pd (1%)/Al$_2$O$_3$ | Pd (2.5%)/ZrO$_2$ | Pd (2.5%)/ZrO$_2$ |
| Amount of catalyst used in step (i) (g) | 1.0 | 1.0 | 1.0 |
| Br containing compound used in step (i) | NH$_4$Br | NH$_4$Br | NH$_4$Br |
| Amount of Br containing compound (mmol) | 0.125 | 0.125 | 0.125 |
| F containing compound used in step (i) | NH$_4$F | NH$_4$F | NH$_4$F |
| Amount of F containing compound (mmol) | 0.526 | 0.012 | 0.012 |
| Br/Pd atom ratio | 1.33 | 0.53 | 0.53 |
| F/Pd atom ratio | 5.6 | 0.05 | 0.05 |
| Calcination temperature in step (ii) (° C.) | 400 | 400 | 500 |
| Gas atmosphere in step (ii) | N$_2$ | N$_2$ | air |
| Calcination period in step (ii) (h) | 2.0 | 1.0 | 2.0 |
| Reaction Conditions in Step (iii) | | | |
| Reactor capacity (cm$^3$) | 100 | 250 | 250 |
| Mineral acid used | H$_3$PO$_4$ | H$_3$PO$_4$ | H$_3$PO$_4$ |
| Concn. of mineral acid (mol/dm$^3$) | 0.1 | 0.03 | 0.03 |
| Volume of mineral acid (cm$^3$) | 50 | 150 | 150 |
| Concn. of solid catalyst (g/dm$^3$) | 2.0 | 3.3 | 3.3 |
| H$_2$/O$_2$ mole ratio in gas mixture | 1.0 | 0.05 | 0.05 |
| Flow rate of gas mixture (cm$^3$/g catalyst/h) | 2900 | 1600 | 1600 |
| Pressure (atm) | 1.0 | 0.96 | 0.96 |
| Temperature (° C.) | 27 | 27 | 27 |
| Contact period (h) | 1.0 | 3.0 | 3.0 |
| Results of H$_2$— to —H$_2$O$_2$ Oxidation | | | |
| Conversion of hydrogen (%) | 42.9 | 37.3 | 40.2 |
| Yield of H$_2$O$_2$ (%) | 24.0 | 25.6 | 24.5 |
| Selectivity of H$_2$O$_2$ (%) | 56.0 | 68.8 | 60.9 |
| Concentration of H$_2$O$_2$ (wt/vol %) | 0.11 | 0.029 | 0.027 |

|  | Example-23 | Example-24 | Example-25 |
|---|---|---|---|
| Solid catalyst used in step (i) | Pd (2.5%)/Ga$_2$O$_3$ | Pd (2.5%)/Hβ | Pd (2.5%)/SiO$_2$ |
| Amount of catalyst used in step (i) (g) | 1.0 | 1.0 | 1.0 |
| Br containing compound used in step (i) | HBr | HBr | NH$_4$Br |
| Amount of Br containing compound (mmol) | 0.125 | 0.125 | 0.125 |
| F containing compound used in step (i) | HF | NH$_4$F | HF |
| Amount of F containing compound (mmol) | 0.009 | 0.012 | 0.006 |
| Br/Pd atom ratio | 0.53 | 0.53 | 0.53 |
| F/Pd atom ratio | 0.04 | 0.05 | 0.026 |
| Calcination temperature in step (ii) (° C.) | 450 | 400 | 400 |
| Gas atmosphere in step (ii) | N$_2$ | He | Ar |
| Calcination period in step (ii) (h) | 3.0 | 1.0 | 1.0 |
| Reaction Conditions in Step (iii) | same as that in Example-22 | same as that in Example-22 | same as that in Example-22 |
| Results of H$_2$— to —H$_2$O$_2$ Oxidation | | | |
| Conversion of hydrogen (%) | 38.5 | 56.3 | 38.5 |
| Yield of H$_2$O$_2$ (%) | 24.8 | 26.4 | 23.3 |
| Selectivity of H$_2$O$_2$ (%) | 64.5 | 47.0 | 60.5 |
| Concentration of H$_2$O$_2$ (wt/vol %) | 0.028 | 0.03 | 0.026 |

|  | Example-26 | Example-27 | Example-28 | Example-29 |
|---|---|---|---|---|
| Solid catalyst t used without its modification in step (i) and step (ii) | Pd 2.5%)/ZrO$_2$ | Pd (2.5%)/Ga$_2$O$_3$ | Pd (2.5%)/Hβ | Pd (2.5%)/SiO$_2$ |
| Reaction Conditions in Step (iii) | Same as that in Example-22 | Same as that in Example-22 | Same as that in Example-22 | Same as that in Example-22 |
| Results of H$_2$— to —H$_2$O$_2$ Oxidation | | | | |
| Conversion of hydrogen (%) | 43.7 | 50.0 | 60.5 | 50.3 |
| Yield of H$_2$O$_2$ (%) | 3.9 | 5.4 | 0.0 | 0.0 |
| Selectivity of H$_2$O$_2$ (%) | 11.2 | 10.8 | 0.0 | 0.0 |
| Concentration of H$_2$O$_2$ (wt/vol %) | 0.004 | 0.006 | Zero | Zero |

|  | Example-30 | Example-31 |
|---|---|---|
| Solid catalyst used in step (i) | Pd (5%)/Al$_2$O$_3$ | Pd (5%)/Al$_2$O$_3$ |
| Amount of catalyst used in step (i) (g) | 1.0 | 1.0 |
| Br containing compound used in step (i) | NaBr | KBr |

TABLE 3-continued

Result of the direct oxidation of hydrogen by oxygen to hydrogen peroxide
for different conditions employed in step (i), step (ii) and step (iii)

|  |  |  |
|---|---|---|
| Amount of Br containing compound (mmol) | 0.63 | 0.63 |
| F containing compound used in step (i) | HF | NaF |
| Amount of F containing compound (mmol) | 0.012 | 0.012 |
| Br/Pd atom ratio | 1.34 | 1.34 |
| F/Pd atom ratio | 0.026 | 0.026 |
| Calcination temperature in step (ii) (° C.) | 400 | 400 |
| Gas atmosphere in step (ii) | $N_2$ | He |
| Calcination period in step (ii) (h) | 1.0 | 1.0 |
| Reaction Conditions in Step (iii) | same as that in Example-22 | same as that in Example-22 |
| Results of $H_2$— to —$H_2O_2$ Oxidation |  |  |
| Conversion of hydrogen (%) | 39.4 | 36.8 |
| Yield of $H_2O_2$ (%) | 14.4 | 10.6 |
| Selectivity of $H_2O_2$ (%) | 36.8 | 27.4 |
| Concentration of $H_2O_2$ (wt/vol %) | 0.016 | 0.012 |

TABLE 4

Result of the $H_2O_2$ decomposition over solid catalysts
comprising palladium before and after their modification in step (i) and step (ii).

|  | Example-32 | Example-33 | Example-34 | Example-35 |
|---|---|---|---|---|
| Solid catalyst used | Pd (5%)/$Al_2O_3$ | Pd (5%)/$Al_2O_3$ | Pd (2.5%)/$ZrO_2$ | Pd (2.5%)/$ZrO_2$ |
| Modification of the Solid Catalyst in step (i) and step (ii) | Same as that in Example-1 | Without any modification | Same as that in Example-1 | Without any modification |
| Results of $H_2O_2$ decomposition |  |  |  |  |
| $H_2O_2$ decomposition (%) in 0.25 h | 0.2 | 10 | 0.42 | 9.6 |
| $H_2O_2$ decomposition (%) in 1.0 h | 2.2 | 38.9 | 1.5 | 33.1 |

|  | Example-36 | Example-37 | Example-38 | Example-39 |
|---|---|---|---|---|
| Solid catalyst used | Pd (2.5%)/$Ga_2O_3$ | Pd (2.5%)/$Ga_2O_3$ | Pd (2.5%)/Hβ | Pd (2.5%)/Hβ |
| Modification of the Solid Catalyst in step (i) and step (ii) | Same as that in Example-23 | Without any modification | Same as that in Example-24 | Without any modification |
| Results of $H_2O_2$ decomposition |  |  |  |  |
| $H_2O_2$ decomposition (%) in 0.25 h | 0.62 | 12.7 | 0.09 | 50.3 |
| $H_2O_2$ decomposition (%) in 1.0 h | 2.4 | 26.0 | 0.7 | 97.4 |

|  | Example-40 | Example-41 | Example-42 |
|---|---|---|---|
| Solid catalyst used | Pd (2.5%)/$SiO_2$ | Pd (2.5%)/$SiO_2$ | Pd (2.5%)/$ZrO_2$ |
| Modification of the Solid Catalyst in step (i) and step (ii) | Same as that in Example-25 | Without any modification | Same as that in Example-22 |
| Results of $H_2O_2$ decomposition |  |  |  |
| $H_2O_2$ decomposition (%) in 0.25 h | 0.75 | 52.9 | 0.32 |
| $H_2O_2$ decomposition (%) in 1.0 h | 4.2 | 99.8 | 0.6 |

Important Features and Advantages of the Method of this Invention Over the Prior Art Methods are as Follows:

1. The method of this invention involves incorporation of both bromine and fluorine halogen in a solid catalyst comprising palladium before its use in the direct oxidation of H2 to $H_2O_2$ in the presence of an aqueous acidic reaction medium: Because of the synergistic effect produced by the presence of both the halogens in the catalyst, both the selectivity of hydrogen peroxide and hydrogen conversion in the direct H2-to-$H_2O_2$ oxidation over the catalyst are high. Consequently the $H_2O_2$ yield is also high.
2. Because of the incorporation of bromine and fluorine, even a totally inactive catalyst for the $H_2$-to-$H_2O_2$ oxidation becomes highly active for the reaction, providing high $H_2O_2$ yield with high selectivity. The improvement in the selectivity and yield for the $H_2O_2$ formation in the $H_2$-to-$H_2O_2$ oxidation due to the incorporation of bromine and fluorine in the catalyst comprising palladium, before its use in reaction, is drastic or very large.
3. Unlike the prior art processes, the halogen promoters in the method of this invention do not present in the liquid reaction medium and hence the corrosion problems, resulting from the presence of halogen promoters in the reaction medium, are totally eliminated.
4. When aqueous phosphoric acid is used as the reaction medium in the method of this invention, there is no leaching of active components, such as palladium and halogen promoters, from the solid catalyst. This makes the solid catalyst very stable and reusable in the direct $H_2$-to-$H_2O_2$ oxidation in the method of this invention.

5. Using the method of this invention, hydrogen peroxide at a concentration as high as ≧1.5 w/v % can be produced with high conversion and high $H_2O_2$ selectivity or yield by the direct oxidation of hydrogen even at atmospheric pressure. Because of the possibility of achieving high $H_2O_2$ concentration in the $H_2$-to-$H_2O_2$ oxidation at a low pressure by the method of this invention, the explosion hazard in the process is drastically reduced.

We claim:

1. Method for the production of hydrogen peroxide by direct oxidation of hydrogen to hydrogen peroxide over a solid catalyst comprising palladium, the method comprising:
    (i) depositing at least two halogen containing compounds on the solid catalyst, a first halogen containing compound comprising bromine and a second halogen compound comprising fluorine, with the bromine to palladium and fluorine to palladium atom ratios in the range from 0.02 to 20 and from 0.01 to 50, respectively;
    (ii) decomposing the halogen compounds deposited on the solid catalyst in step (i) by calcination at a temperature above 200° C. under inert, reducing or oxidizing gas atmosphere or under vacuum; and
    (iii) contacting a solid catalyst obtained from step (ii) with a gas mixture consisting of hydrogen and oxygen or air or $O_2$ enriched air in an aqueous reaction medium containing a mineral acid.

2. A method according to claim 1, wherein the compound comprising bromine is selected from the group consisting of ammonium bromide and hydrobromic acid.

3. A method according to claim 1, wherein the compound comprising fluorine is selected from the group consisting of ammonium fluoride and hydrofluoric acid.

4. A method according to claim 1, wherein in step (iii) the concentration of mineral acid in the reaction medium is above 0.001 mol/dm$^3$, concentration of the solid catalyst in the reaction medium is above 0.01 g/dm$^3$, $H_2/O_2$ mole ratio in the gas mixture is in the range from 0.01 to 10, flow rate of the gas mixture is in the range from 50cm$^3$/g catalyst/h to 50,000 cm$^3$/g catalyst/h, gas pressure is at least 0.9 atm, and temperature is below 100° C. and contact period of the reaction medium is at least 0.01h.

5. A method according to claim 1, wherein the bromine to palladium atom ratio is between 0.1 and 5.

6. A method according to claim 1, wherein the fluorine to palladium atom ratio is between 0.05 and 10.

7. A method according to claim 1, wherein the calcination temperature in step (ii) is between 300° C. and 600° C.

8. A method according to claim 1, wherein the gas atmosphere for the decomposition in step (ii) is inert gas atmosphere selected from the group consisting of nitrogen, helium and argon.

9. A method according to claim 1, wherein in step (iii) the mineral acid in the reaction medium is phosphoric acid.

10. A method according to claim 1, wherein in step (iii) the concentration of mineral acid in the reaction medium is between 0.01 mol/dm$^3$ and 1.0 mol/dm$^3$.

11. A method according to claim 1, wherein in step (iii) the concentration of the catalyst in the reaction medium is between 0.5 g/dm$^3$ and 25 g/dm$^3$.

12. A method according to claim 1, wherein in step (iii) the $H_{2/O2}$ mole ratio in the gas mixture is between 0.04 and 4.0.

13. A method according to claim 1, wherein in step (iii) flow rate of the gas mixture is between 500 cm$^3$/g catalyst/h and 10,000 cm$^3$/g catalyst/h.

14. A method according to claim 1, the gas mixture in step (iii) is a mixture of $H_2$ and $O_2$.

15. A method according to claim 1, wherein in step (iii) the temperature is between 5° C. and 50° C.

16. A method according to claim 1, wherein in step (iii) the contact period of the reaction medium is between 0.2 h and 10 h.

17. A method according to claim 1, wherein in step (iii) the $H_{2/O2}$ mole ratio in the gas mixture is about 1.

18. A method according to claim 1, wherein the first halogen containing compound consists essentially of the bromine and the second halogen containing compound consists essentially of the fluorine.

19. A method for the production of hydrogen peroxide by direct oxidation of hydrogen to hydrogen peroxide comprising:
    (a) providing a solid catalyst obtained by the steps of: (i) impregnating a palladium catalyst with a fluorine-containing compound and a bromine-containing compound; and (ii) calcining the impregnated catalyst at a temperature above 200° C. under inert, reducing or oxidizing gas atmosphere or under vacuum to decompose the fluorine-containing and bromine-containing compounds to obtain the solid catalyst, wherein respective ratios of bromine atoms to palladium atoms and fluorine atoms to palladium atoms in the impregnated catalyst in step (i) are such that, when the solid catalyst is used to catalyze the direct oxidation of hydrogen by contacting the solid catalyst with a gas mixture comprising hydrogen and oxygen in an aqueous reaction medium containing a mineral acid, the direct oxidation proceeds with a selectivity or yield for $H_2O_2$ or a conversion of $H_2$ that is greater than that of the solid catalyst formed without the fluorine or bromine atoms, the ratio of bromine atoms to palladium atoms in the impregnated catalyst being in a range of 0.02 to 20 and the ratio of fluorine atoms to palladium atoms in the impregnated catalyst being in a range of 0.01 to 50; and
    (b) contacting the solid catalyst with a gas mixture comprising hydrogen and oxygen in an aqueous reaction medium containing a mineral acid to effect the direct oxidation of the hydrogen to hydrogen peroxide.

* * * * *